United States Patent [19]

MacInnes et al.

[11] Patent Number: 4,504,187
[45] Date of Patent: Mar. 12, 1985

[54] TURBOCHARGER METHOD OF OPERATION AND TURBINE HOUSING THEREFOR

[75] Inventors: Hugh MacInnes, La Canada; Jon A. Meyer, Arleta; Andrew E. Johnston, Granada Hills; John W. Fort, Jr., Woodland Hills, all of Calif.

[73] Assignee: Roto-Master, Inc., N. Hollywood, Calif.

[21] Appl. No.: 376,492

[22] Filed: May 10, 1982

[51] Int. Cl.³ .................. F01D 17/00; F01D 25/24
[52] U.S. Cl. .................................... 415/1; 415/144; 415/205
[58] Field of Search ............... 415/144, 28, 205, 1, 415/, 208, 199.5, 121 R, 121 A

[56] References Cited

U.S. PATENT DOCUMENTS

| | | | |
|---|---|---|---|
| 2,288,734 | 7/1942 | Noack | 415/121 A X |
| 2,963,863 | 12/1960 | Middlebrooks, Jr. | 415/144 |
| 3,044,683 | 7/1962 | Woollenweber, Jr. | 60/600 X |
| 3,274,757 | 9/1966 | Wapler | 415/121 A |
| 3,313,518 | 4/1967 | Nancarrow | 415/202 |
| 3,380,711 | 4/1968 | Blattner et al. | 415/121 R |
| 3,423,926 | 1/1969 | Nancarrow et al. | 415/205 |
| 4,076,460 | 2/1978 | Roof | 415/121 R X |
| 4,224,794 | 9/1980 | Woollenweber | 60/602 |
| 4,245,953 | 1/1981 | Milton et al. | 415/144 |

Primary Examiner—Philip R. Coe
Assistant Examiner—Frankie L. Stinson
Attorney, Agent, or Firm—Cislo, O'Reilly & Thomas

[57] ABSTRACT

A method of operating turbochargers for use with internal combustion engines and a turbine housing therefor wherein the housing is uniquely configured so as to be able to be mounted in the engine compartment in a variety of modes and wherein the turbocharger may or may not be used in conjunction with a wastegate control. The unique configuration of the turbine housing permits the passage of exhaust gas through the interior of the turbine housing and more specifically through the extent of the internal scroll thereof wherein the exhaust gas imparts to the turbine operation peak efficiency before the driving gas is vented through a wastegate passageway at the terminus of the turbine housing as opposed to the entry thereof. The exhaust gases may also be bypassed from a point between the entry and terminus of the internal scroll. The method of operation is such that the exhaust gas velocity within the turbine housing and more specifically the internal scroll thereof, is at high velocity in the peak efficiency range during turbine operation and during wastegating, thereby reducing turbine back pressure on the internal combustion engine as compared to that pressure that would be developed should the driving gas be wastegated or bypassed before it entered the turbine housing, and more specifically, the internal scroll thereof.

9 Claims, 6 Drawing Figures

TURBOCHARGER METHOD OF OPERATION AND TURBINE HOUSING THEREFOR

BACKGROUND OF THE INVENTION

This invention relates to methods of operating turbochargers and to a unique turbine housing design for a turbocharger.

Turbochargers are well known in the prior art and conventionally utilize a turbine wheel and a compressor impeller mounted on a unitary or common shaft, carried within respective housings for same. The turbine housing includes a gas inlet and a gas outlet wherein there is provided, in the typical case, an internal scroll configuration as is well known to the art.

Exhaust gases from an engine are directed to the turbine housing to drive the turbine wheel which in turn causes rotation of the compressor impeller which compresses ambient air and/or air-fuel mixture to supply same in the compressed state to the intake manifold of the engine. The gas outlet is connected to an exhaust gas discharge system through which the spent exhaust gases are passed. In cases where it is necessary to prevent overcompression of the air or air-fuel supply mixture being fed to the engine, it becomes necessary to bypass the turbine and to wastegate the excess gases to the exhaust gas system. The prior art has typically provided for bypassing of the unwanted exhaust gases prior to introduction thereof into the turbine of the turbocharger which necessarily has dictated that valving arrangements be positioned in proximity to the turbine housing or to be integral therewith. In so doing, the acutator being located on either the turbine or compressor housing limits the location of the device within the engine compartment, or alternatively, requires special mounting brackets and the like, which severely curtails placement of the device in the engine compartment because of space and size limitations.

This invention relates to a method of operating turbochargers and more specifically the turbine thereof, at its highest level of efficiency and to bypass exhaust gases once same have been fed through the turbine housing and more specifically the internal scroll thereof and to provide a turbine housing which has the capability of being adapted for use with or without a wastegate mechanism. Where a wastegate mechanism is utilized in conjunction with the turbocharger, a modular design wastegate may be used which may be selectively and conveniently associated with the turbine housing of the invention so that the turbocharger unit may be utilized in a variety of modes within an engine compartment in various mounting positions. The central location of the bypass gas exit port or wastegate port in a central manner allows for symmetrical placement of the device within the engine compartment to thereby provide for left or right mounting in conjunction with other of the apparatus making up the total assemblage.

The turbine housing of the invention with the integral wastegate provision at the terminus of the internal scroll of the turbine housing, as opposed to the inlet, thereof allows for operation of the turbine at higher efficiency and further permits use of the turbine housing without a wastegate should the need arise by simple capping off of the exit port.

OBJECTS AND SUMMARY OF THE INVENTION

It is an object of the invention to provide a unique manner of operating a turbocharger having a unique turbine housing.

It is another important object of the invention to provide a turbocharger turbine housing having a selectable wastegate provision.

It is another even further more specific object of the invention to provide a turbocharger turbine housing having an internal scroll with a bypass exit port intermediate the entry and terminus of said scroll.

It is another even further important object of the invention to provide a method of operating a turbocharger in the wastegated mode, having a radial inflow turbine at substantially greater efficiency than has heretofore been possible.

It is another even further more specific object of the invention to provide a turbine housing for use with a turbocharger wherein the turbine housing has a wastegate bypass exit port at the terminus of an internal scroll of said turbine housing and wherein same is centrally located in symmetrical fashion so as to permit ease of placement of the turbine housing within an engine compartment.

It is another even further more specific and important object of the invention to provide a turbine housing having an internal scroll wherein exhaust gases are directed along substantially the internal volume defined by said internal scroll prior to being selectively exhausted in a bypass manner therefrom.

It is another even further more specific and important object of the invention to provide a turbocharger turbine housing having an internal scroll wherein a bypass port is located at the terminus of said internal scroll and wherein said exit port is selectively adaptable for association with a wastegate component.

It is another important even further more specific important object of the invention to provide a turbine housing for use with turbochargers wherein said turbine housing is provided with an internal scroll having an exit port at the terminus thereof, which exit port is centrally located with respect to the remainder of said housing so as to permit ease of disposition thereof within an engine compartment.

It is another even further more specific object of the invention to provide a turbine housing for association with turbochargers and the like wherein the turbine wheel is operated at higher efficiency and wherein bypassing of any gases flowing to said turbine housing is selectively obtained only after passage of said gases through the internal scroll thereof.

It is another even further more specific and important object of the invention to provide a method of operating a turbocharger, having a turbine housing with an internal scroll, wherein during wastegating operations lower back pressure to the engine with which the turbocharger is utilized is obtained.

It is another and still even further important object of the invention to provide a method of turbocharger turbine operation and a turbine housing therefor wherein exhaust gases travel substantially the full extent of said internal housing prior to being exited at the terminus thereof for wastegating purposes so as to reduce turbine back pressure on the internal combustion engine with which the turbocharger is utilized.

Generally, in an exemplary embodiment, the invention is directed to the method of operating a turbocharger having a turbine housing with an internal scroll configuration, which is associated with a wastegate means to bypass exhaust gases, wherein bypassing of exhaust gases takes place at the terminus of said internal scroll configuration. The turbine housing utilized in the method of operation of the turbocharging of the internal combustion engine has an internal scroll configuration with an exit port at the approximate terminus of the internal scroll which exit port is selectively adapted to permit the passage of exhaust gas therethrough.

These and further objects of the invention will become apparent from the hereinafter following commentary taken in conjunction with the figures of drawing.

DESCRIPTION OF THE BEST EMBODIMENTS CONTEMPLATED

Figure 1:
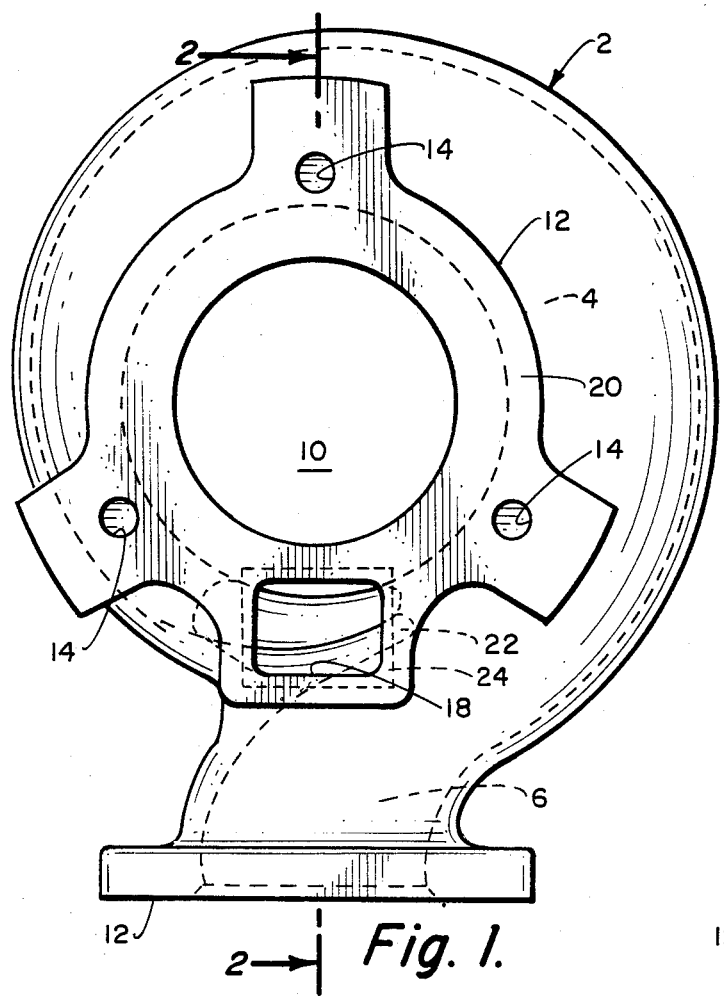
FIG. 1 is a front elevational view of a turbine housing component of a turbocharger having an internal scroll configuration.

Referring to the drawing, wherein like numerals of reference designate like elements throughout, it will be seen that the turbine housing 2 is of conventional type having an internal scroll configuration generally designated 4 and wherein the turbine housing 2 is provided with inlet 6 and outlet 8 with the typical internal cavity 10 to receive the turbine wheel member, not shown.

The housing 2 is of conventional type having the flanged portions 12 and 20 with appropriate threaded mounting bores 14 as those of ordinary skill in the art will at once appreciate.

The internal scroll configuration 4, which is a gas passage of spiral converging aperture, has a tongue terminus 22 which acts as a nozzle to direct exhaust gases introduced into the inlet 6 and having passed through the internal scroll 4 to impinge upon the blades of the turbine wheel, not shown. At the gas passage terminus 16 is provided a central bore or port 18 which may be covered over by means of a cover plate, not shown, where wastegating of the turbine is not desired.

The turbine housing 2 presents a planar face 20 having a coincidence with the outlet 8 and the exit port 18. It will be noted that the exit port 18 has a constant area transition bore with respect to the face 20 of turbine housing 2.

Figure 2:
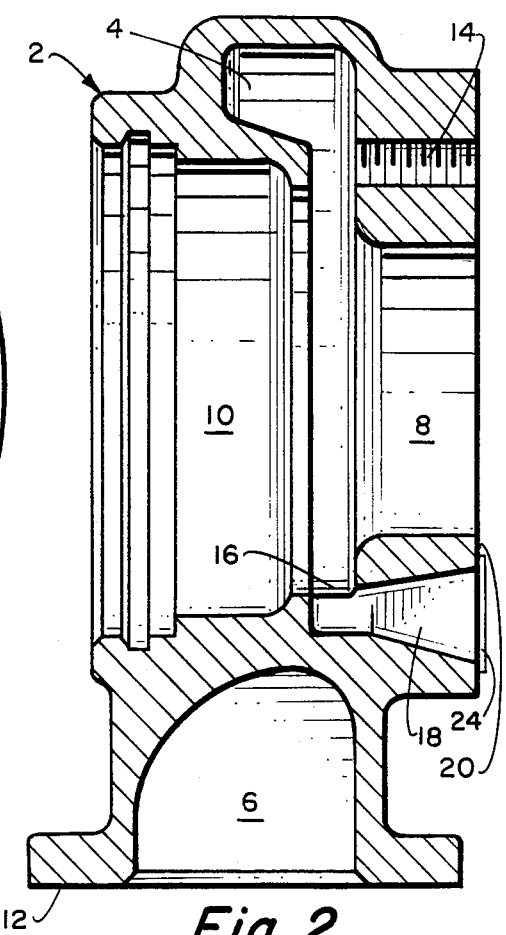
FIG. 2 is a view taken along the line 2—2 of FIG. 1.

In the turbine housing 2 illustrated in FIGS. 1 and 2, where wastegating is desired it should be noted that the disposition of the exit port 18 is such that the turbine housing may be associated in conjunction with a wastegate mechanism so as to be used remotely from the wastegate mechanism, if so desired. When the exit port is uncovered, for utilization with wastegating mechanism, exhaust gases entering inlet 6 are passed to the interior housing and more specifically to the internal scroll 4 prior to reaching the exit 16 where it impinges upon the turbine blades, not shown, mounted within the chamber 10 of turbine housing 2. Obviously, should a cover plate 24 be provided so as to block off the outlet 18 to the plane of surface 20, exhaust gases would not be allowed to pass through the port 18, but rather would be directed entirely through the turbine wheel and thence to the exhaust outlet 8.

Figure 3:
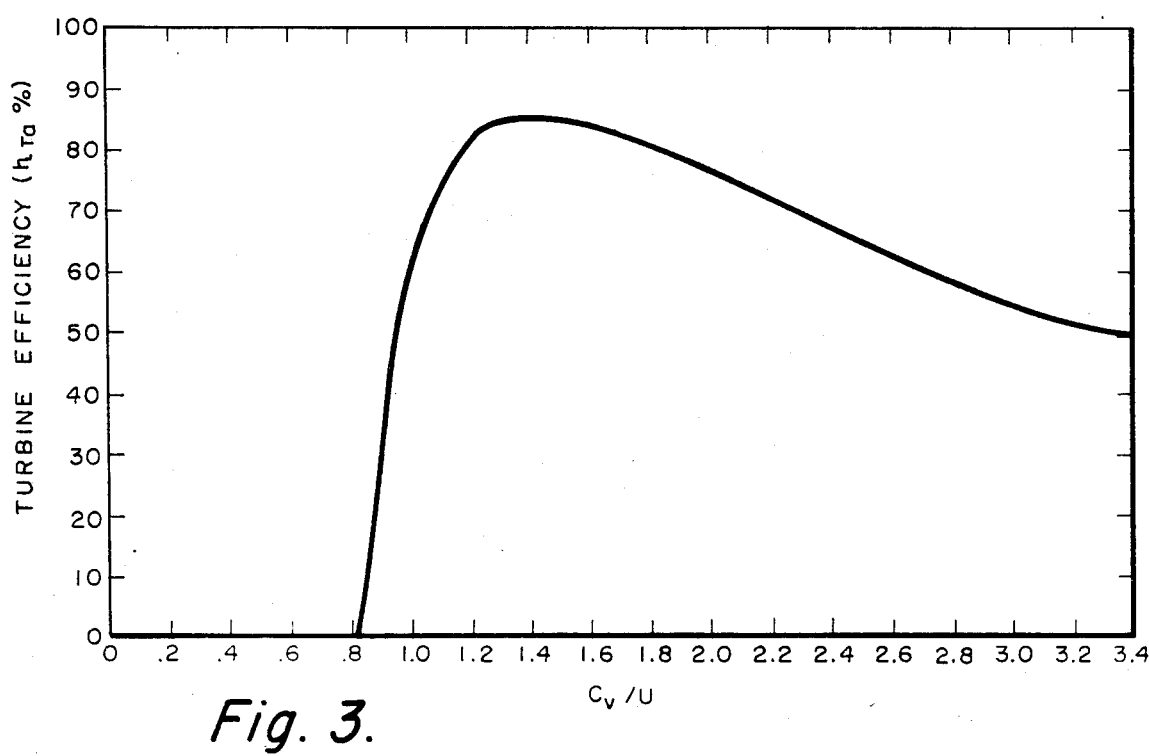
FIG. 3 is a graph illustrating turbine efficiency of a radial inflow turbine during operation thereof.

Referring to FIG. 3 there is shown a graph plotting turbine efficiency of a radial inflow turbine which efficiency is a function of the ratio of tangential gas velocity to turbine tip speed. This relationship is plotted as seen in FIG. 3.

Peak efficiency is obtained in this case where $C_v/U = 1.35$ where $C_v$ is tangential gas velocity; and U is turbine wheel tip speed.

Efficiency drops off very quickly below 1.2 and only gradually above 1.6. Thus, in the method of operation of the turbine of the invention all of the gas is passing through the internal scroll of the turbine housing at all times thereby imparting a higher tangential gas velocity to the system than would normally be anticipated during wastegating operation in prior art systems, where wastegating is accomplished prior to exhaust gas entering into the inlet of the internal scroll. The higher velocity of the exhaust gas entering into the turbine housing of the invention will cause the turbine to run in a higher efficiency range during wastegating than would normally be expected in the conventional wastegating of prior art turbochargers. This in turn reduces the turbine back pressure on the engine compared to the conventional wastegating operation, which permits bypassing of exhaust gas before entering the inlet of the internal scroll of the turbine housing.

Figure 4:
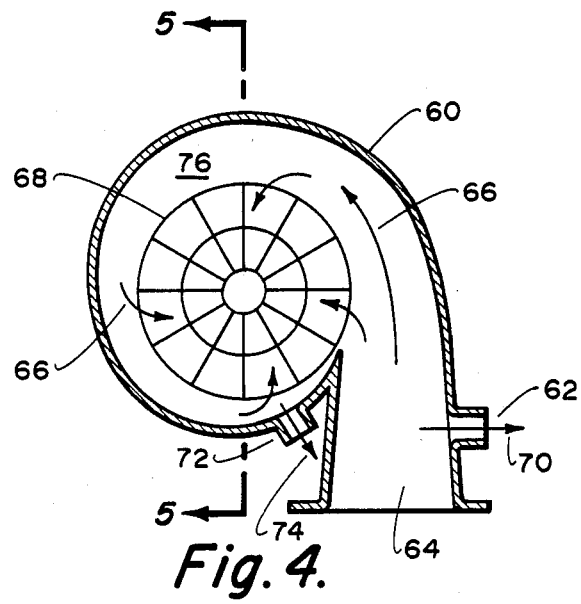
FIG. 4 is a schematic illustration showing the inventive concept in relation to the prior art.
Figure 5:
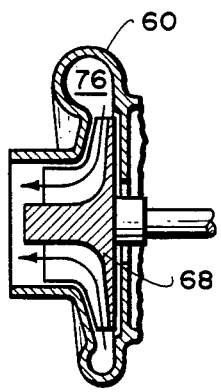
FIG. 5 is a fragmented view taken along the line 5—5.
Figure 6:
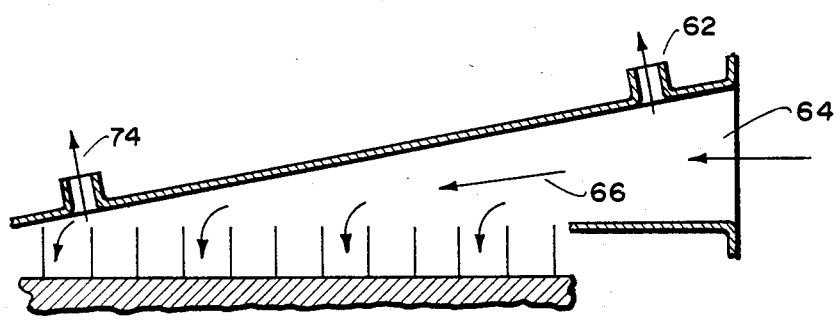
FIG. 6 is a schematic illustration showing the benefits of the invention relative to the prior art.

Referring to FIGS. 4, 5 and 6, there is illustrated in schematic fashion a prior art turbine 60 with the normal location 62 of a wastegate port with regard exhaust gas entering the inlet of the turbine 64 with the flow thereof being depicted by the arrows 66 in order to drive the turbine wheel 68. In the prior art conventional turbocharger, the normal location of the wastegate port is at 62 in order to allow gas to be exited therefrom as indicated by the arrow 70.

However, in the present practice of the invention, a exit port 72 is located proximate the terminus of the gas passageway of the spiral converging aperture or scroll configuration provided within the turbine 60 as at 72 so that the exhaust gas is exited therefrom in the direction of the arrow 74.

The location of the exit port 72 proximate the terminus of the gas passageway 76 allows for operation of the turbocharger and more specifically the turbine wheel 68 at a substantially higher efficiency and with reduced turbine back pressure on the internal combustion engine with which the turbocharger is used.

The FIG. 6 showing clearly illustrates the difference of the location of the conventional prior art exit port 62 relative to the positioning of the exit port 74 in accordance with the invention so as to be able to obtain the greater attributes of the invention by having the gas flow through a majority of the internal scroll of the turbocharger 60 so as to obtain the benefits of the invention as graphically depicted in FIG. 3.

While the preferred form of the invention, in order to achieve the highest exhaust gases momentum, is to flow the gases through the extent of the internal scroll, where desired, wastegating may be caused to take place at any point intermediate the entry and terminus of the scroll. Those of ordinary skill will at once recognize how such an exit port may be provided in the turbine housing.

Thus, there has been disclosed and described, in illustrative fashion, a unique method of operation of a turbine comprising part of a turbocharger for internal combustion engines and a turbine housing of unique configuration for use therewith.

Those of ordinary skill in the art will at once recognize various changes and modifications from those which have been disclosed but all such changes and modifications will not depart from the essence of the invention as disclosed herein and all such changes and modifications are intended to be covered by the appended claims.

We claim:

1. In a turbine housing for turbochargers and the like having an inlet and an outlet and an interior gas passageway of spiral converging aperture or scroll configuration for the passage of exhaust gas therethrough to said outlet to a turbine, said gas passageway having a large aperture at said inlet and a smaller aperture at its terminus downstream thereof, the improvement which comprises an exit port in said turbine housing positioned within said gas passageway proximate the terminus of said gas passageway such that the entirety of said gas is required to travel the extent of said passageway to said terminus to impart a high tangential gas velocity and cause the turbine to run at a higher efficiency range, said exit port comprising means for selectively permitting the passage of bypass gas therethrough.

2. The turbine housing for turbochargers and the like in accordance with claim 1 wherein said exit port communicates with a wastegate.

3. The turbine housing for turbochargers and the like in accordance with claim 2 wherein said exit port is provided with means to permit the same to be blocked off by means of a cover plate or the like.

4. The turbine housing for turbochargers and the like in accordance with claim 2 wherein said exit port is in about the same plane as the plane of said outlet.

5. The turbine housing for turbochargers and the like in accordance with claim 4 wherein said exit port has an about constant area configuration in cross-section relative to the interior of said turbine housing and extends from the interior of said housing to an external surface thereof.

6. The turbine housing for turbochargers and the like in accordance with claim 5 wherein said exhaust gases flow radially into said turbine wheel.

7. In the method of operating a turbocharger having a turbine housing with an inlet and an outlet and an internal gas passageway of spiral converging aperture or scroll configuration for the passage of exhaust gas therethrough to said outlet to a turbine, said gas passageway having a large aperture at said inlet and a smaller aperture at its terminus downstream thereof, and being associated with a wastegate means proximate the terminus of said gas passageway to bypass exhaust gases, the steps of:
  (a) introducing exhaust gases into said turbine housing;
  (b) causing the entirety of said exhaust gases to travel the extent of said passageway between the entry and terminus thereof; and
  (c) selectively permitting exhausting of said exhaust gases proximate the terminus of said internal scroll to said wastegate means;
  (d) whereby a high tangential velocity is is imparter to said gas and the turbine is caused to run at a higher efficiency range.

8. The method in accordance with claim 7 wherein the turbine wheel of said turbocharger is operated within an efficiency range of about 80–90% and said exhaust gases are permitted to travel about the full extent of said internal scroll before being exhausted at about the terminus of said internal scroll.

9. The method in accordance with claim 8 wherein the ratio of the tangential gas velocity to turbine wheel tip speed is maintained at a selected value to obtain high efficiency of operation of said turbocharger.

* * * * *